United States Patent [19]

Inoue et al.

[11] Patent Number: 4,778,584

[45] Date of Patent: Oct. 18, 1988

[54] LIQUID FILTER DEVICE

[75] Inventors: Noboru Inoue; Takaaki Fukumoto; Masaharu Hama; Katsuhiko Tamura, all of Hyogo; Kimihiko Okaue, Osaka, all of Japan

[73] Assignees: Zeotec LRC Corporation; Liquid Concerned Ltd.; Mitsubishi Denki Kabushiki Kaisha, all of Japan

[21] Appl. No.: 875,089

[22] Filed: Jun. 17, 1986

[30] Foreign Application Priority Data

Aug. 28, 1985 [JP] Japan .......................... 60-132715[U]
Aug. 28, 1985 [JP] Japan .......................... 60-132716[U]
Sep. 24, 1985 [JP] Japan .......................... 60-211581[U]

[51] Int. Cl.$^4$ .............................................. C25G 9/00
[52] U.S. Cl. .................................... 204/272; 204/275; 204/276
[58] Field of Search ............... 204/130, 284, 257, 263, 204/264, 275–276, 260, 272, 232

[56] References Cited

U.S. PATENT DOCUMENTS

| | | |
|---|---|---|
| 671,946 | 4/1901 | Holland ................................ 204/276 |
| 838,390 | 12/1906 | Dieterich ............................ 204/276 |
| 3,135,674 | 6/1964 | Ruetschi ............................. 204/284 |
| 3,180,810 | 4/1965 | Pearce et al. ...................... 204/264 |
| 3,457,152 | 7/1964 | Maloney et al. ................... 204/130 |
| 3,977,451 | 8/1976 | L-Caciedo .......................... 204/130 |
| 4,350,590 | 9/1982 | Robinson ............................ 210/243 |
| 4,592,836 | 6/1986 | Chiao .................................. 210/168 |

OTHER PUBLICATIONS

Patents Abstracts of Japan, Apr. 10, 1980, vol. 4/No. 46, "Electrostatic Water Treatment Apparatus".

Primary Examiner—R. L. Andrews
Attorney, Agent, or Firm—Lowe, Price, LeBlanc, Becker & Shur

[57] ABSTRACT

Disclosed is a liquid filter device for effectively eliminating impurities from liquid.

Voltage is applied to liquid to break electrostatic coupling of liquid molecules and impurity molecules. The impurity molecules are electrostatically adsorbed by an electrode containing adsorbent having charges different in polarity from those of the impurity molecules.

Voltage is applied to liquid to break electrostatic coupling of liquid molecules and impurity molecules. Adsorbent having charges different in polarity from those of the impurity molecules on its surface is provided between a pair of electrodes to electrostatically adsorb the impurity molecules. After the impurity molecules are electrostatically adsorbed, the liquid is filtrated by a filter.

Voltage is applied to liquid to eliminate zeta potentials which are potential difference at electric double layers having charges different in polarity from those of impurity particles in interfaces between the impurity particles and the liquid. The impurity particles are electrostatically aggregated, and the liquid is filtrated by a filter.

9 Claims, 8 Drawing Sheets

1

LIQUID FILTER DEVICE

BACKGROUND OF THE INVENTION

1. Field of the Invention

The present invention relates to a liquid filter device for eliminating impurities from liquid, and more particularly, to a liquid filter device, e.g., is connected to, e.g., an oil tank of a vacuum pump to effectively eliminate impurities from lubricating oil for the vacuum pump.

2. Description of the Prior Art

In general, the following characteristics are required for a liquid filter device for eliminating impurities from liquid:

(1) The impurities are effectively eliminated.
(2) The device is of small size.
(3) The device is economical including the cost and maintenance.

In order to satisfy these requirements, there have been provided the following types of devices:

(A) Liquid is filtrated by a filter.

(B) A plurality of electrode pairs are provided in an electrode tank. A collector such as filter paper is provided between the plurality of electrode pairs. Electrostatic coupling of liquid molecules and impurity molecules is broken to electrostatically adsorb the impurity molecules in the collector.

(C) Liquid is introduce between electrodes in an electrode tank to break electrostatic coupling of liquid molecules and impurity molecules. After the electrostatic coupling with the liquid molecules is broken, the impurity molecules are electrostatically adsorbed by adsorbent contained in an adsorption tank, and the liquid passing through the adsorbent is filtrated by a filter contained in a filter tank.

The device of the item (A) is small-sized and satisfies the aforementioned condition (1) However, whereas the same cannot filtrate impurities smaller than the mesh of the filter and cannot recycle the filtrated liquid. Thus, this device does not satisfy conditions (2) and (3).

The device of the item (B) is small-sized and satisfies the condition (1), whereas merely about 1/10 of the impurities are in direct contact with the collector to be electrostatically adsorbed by the same, while it takes time to eliminate the impurities. Further, although impurities such as dust can be eliminated, the liquid cannot be recycled. When the liquid contains moisture, the collector adsorbs the moisture to cause a short between the electrodes, and voltage cannot be applied to the liquid. Thus, this device does not satisfy the conditions (2) and (3).

The device of the item (C) can effectively adsorb the impurities as well as recycle the liquid to satisfy the condition (2). However, this device is increased in size and cost, and cannot satisfy the conditions (1) and (3).

SUMMARY OF THE INVENTION

It is an object of the present invention to provide a small-sized liquid filter device which can effectively eliminate impurities from liquid, and which is economical including cost and maintenance.

The device according to the present invention is in the following structures (1) to (3), to perform the following operations (A) to (C):

(1) At least a pair of electrodes are provided in an electrode tank such that one of the electrodes contains adsorbent.

(2) An electrode tank is provided therein with at least a pair of electrodes, adsorbent provided between the electrodes, a filter for filtrating liquid passing through the adsorbent and another electrode covered by the filter and having openings or a plurality of pores.

(3) An electrode tank is provided therein with at least a pair of electrodes, a filter for filtrating liquid to which voltage is applied by the electrodes and another electrode covered by the filter and having openings or a plurality of pores.

(A) Voltage s applied between electrodes to break electrostatic coupling of liquid molecules and impurity molecules. Upon breakage of the electrostatic coupling wth the liquid molecules, the impurity molecules are electrostatically adsorbed by adsorbent.

(B) Voltage is applied between electrodes to break electrostatic coupling of liquid molecules and impurity molecules. Upon breakage of the electrostatic coupling with the liquid molecules, the impurity molecules are electrostatically adsorbed by adsorbent. Upon adsorption of the impurity molecules by the adsorbent, the liquid is filtrated by a filter.

(C) Voltage is applied to liquid to erase zeta potentials at electric double layers formed in interfaces between impurity particles and the liquid and having charges different in polarity from those of the impurity particles. After the zeta potentials are erased, the impurity particles are bulkily aggregated. The bulkily aggregated impurity particles are filtrated by a filter.

These and other objects, features, aspects and advantages of the present invention will become more apparent from the following detailed description of the present invention when taken in conjunction with the accompanying drawings.

DESCRIPTION OF THE PREFERRED EMBODIMENTS

The present invention is directed to a liquid filter device for eliminating chlorine gas and ammonia gas from the air, ion and degraded products from oil and acid and oil from the water, dehydrating and precisely filtrating nonaqueous lubricating oil, working oil, stock oil and the like and precisely filtrating aqueous lubricating liquid, working liquid, stock liquid, washing liquid and the like.

Figure 1:
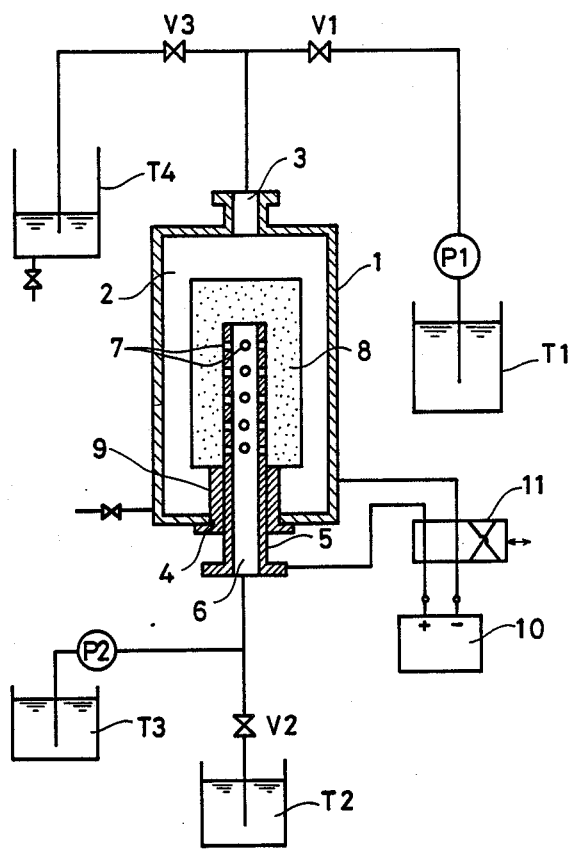
FIG. 1 illustrates the basic structure of the present invention.
Figure 2:
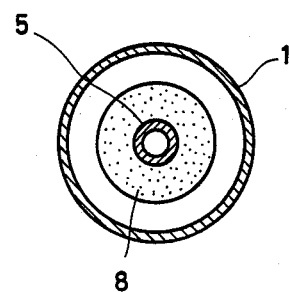
FIG. 2 is a sectional view taken along the diametrical direction of FIG. 1.

FIGS. 1 and 2 show a basic structure of the present invention. Referring to FIGS. 1 and 2, an outer cylindrical electrode 1 is provided with an inlet port 3 communicating with a slow-speed treating chamber 2 and an electrode support hole 4. A central electrode 5 has a passage defining a path 6 axially passing through its interior and a plurality of through-holes 7 formed in its peripheral wall to communicate with the passage 6. An adsorbent layer 8 is provided on the outer periphery of the central electrode 5 to cover the upper opening end of the path 6 and the passholes 7. The adsorbent layer 8 is formed by adsorbent such as activated clay, zeolite, activated alumina or silica gel, which is provided on its surface with charges different in polarity from those of adsorbed materials. An insulator 9 is inserted in the electrode support hole 4 to insulatingly support the central electrode 5 with respect to the outer cylindrical electrode 1 while making the lower opening end of the path 6 extend downwardly from the outer cylindrical electrode 1. A DC power supply 10 is adapted to apply voltage of 1 to 10,000 V/cm responsive to treated liquid between the outer cylindrical electrode and the central electrode 5. A switch 11 is adapted to switch polarity of the DC voltage applied to the outer cylindrical electrode 1 and the central electrode 5 to restore adsorbing efficiency of the adsorbent when the same is saturated.

The outer cylindrical electrode 1 and the central electrode 5 form an electrode apparatus.

Description is now made on the operation of this structure. Untreated liquid is introduced from an untreated liquid tank T1 into the inlet port 3 of the outer cylindrical electrode 1 through a pump P1 and a valve V1. DC voltage is applied to the untreated liquid to break electrostatic coupling of liquid molecules and impurity molecules. The adsorbent of the adsorbent layer 8 is attracted in the field direction by application of the DC voltage to be provided with strong charges on its porous surface by atomic polarization and molecular polarization while strong Coulomb forces continuously work between the adsorbent and the impurity molecules to adsorb the impurities in the porous surface of the adsorbent. The liquid passing through the adsorbent layer 8 for adsorption of the impurities flows into the path 6 of the central electrode 5 through the holes 7, to be discharged from the lower opening end into a treated liquid tank T2 through a valve V2.

When the adsorbent of the adsorbent layer 8 is saturated, the switch 11 is operated to repulsively discretize the impurities from the adsorbent while closing the valve V1, opening a valve V3 and driving a pump P2. Upon driving of the pump P2, washing liquid is introduced from a washing tank T3 into the path 6 to flow into the outer cylindrical electrode 1 through the holes 7 and the adsorbent layer 8 to wash out the impurities repulsively discretized from the adsorbent into an impurity tank T4 through the valve V3.

Thus, the voltage is applied to the adsorbent to strengthen the charges on the porous surface of the adsorbent, whereby the adsorbent is improved in adsorbing efficiency and reduced in volume, to improve the adsorbing elimination factor in comparison with the prior art merely bringing impurities in contact with adsorbent.

If the adsorbent is simply renewed upon saturation, the switch 11, the pump P2, the washing tank T3, the valve V3 and the impurity tank T4 are not required. In this case, the DC power supply 10 may be replaced by an AC power supply or a DC-AC superposed power supply.

Figure 3:
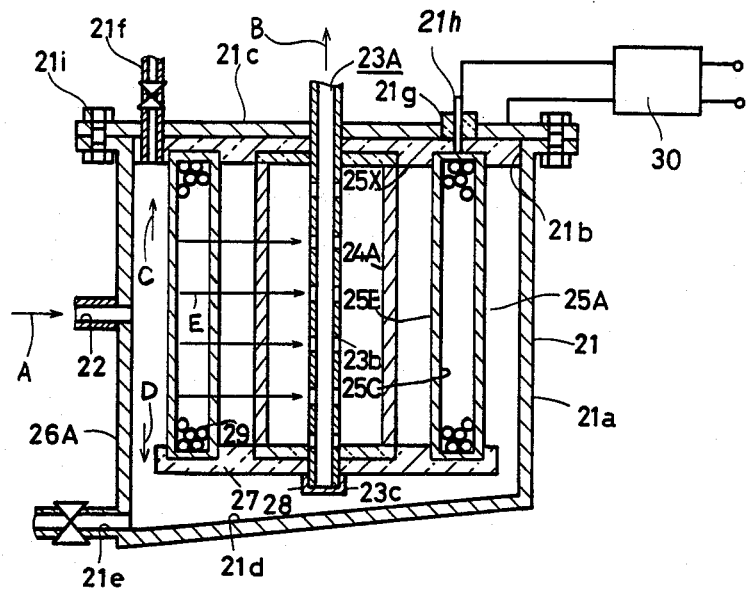
FIGS. 3 and 4 are front sectional views showing an embodiment of the present invention.

FIG. 3 shows an embodiment of the present invention. Referring to FIG. 3, a vessel 21 serving as a first electrode is formed by a container member 21a and a lid member 21c covering its opening 21b. The container member 21a is provided with a tapered portion 21d in its bottom surface and a first drain 21e in its lower side surface to communicate with the tapered portion 21d. The lid member 21c has a second drain 21f, and receives an electrode connecting conductor 21h through an insulating member 21g. The container member 21a and the lid member 21c are connected with each other by bolts 21i. An inlet port 22 is provided in the side portion of the container member 21a to introduce untreated liquid into the same. An outlet port 23A is formed by a conductive pipe serving as a third electrode inserted in the lid member 21c. A filter 24A formed by an insulative dielectric member has one end surface is mounted to the lid member 21c. An end portion 23c extending downwardly from the other end surface of the filter 24A is blocked by a cap nut 28 as hereinafter described, while through-holes 23b are uniformly provided in the interior of the filter 25A. Porous or meshed second electrodes 24A and 25B are doubly provided concentrically about the outlet port 23A, to form a cylindrical electrode vessel 25C. An end surface of the electrode vessel 25C is mounted to the lid member 21c through an insulating member 25x, to be connected with the electrode connecting conductor 21h. The insulating member 25x further connects an end surface of the filter 24A with the lid member 21c. An electrode apparatus 26A is formed by the vessel 21 serving as the first electrode, the second electrodes 25A and 25B and the outlet port 23A serving as a third electrode. A bottom plate 27 is formed by an insulating material mounted to the other end surface of the electrode vessel 25c while making the end portion 23c of the outlet port 23A extend downwardly. The fixture 28 is formed by, e.g., a cap nut threadedly engages the outer periphery of the end portion 23c of the outlet port 23A to block the same and mount the bottom plate 27 to the outlet port 23A. The electrode vessel 25C contains adsorbent 29 which is prepared by, e.g., activated clay, zeolite or Silbead (trade name). A transformer 30 is connected with the lid member 21c and the electrode vessel 25C to apply voltage of, e.g., 10 to 3,000 V/cm.

Description is now made on the operation of this embodiment. Untreated liquid is introduced into the vessel 21 through the inlet port 22 as shown by an arrow A, to be supplied with voltage by the electrode apparatus 26A. Such voltage breaks electrostatic coupling of liquid molecules and impurity molecules in the liquid flowing between the container member 21a and the electrode vessel 25C, whereby relatively large-particle impurities are attracted by the electrode vessel 25C through Coulomb force to be collected around the second electrode 25A and bulkily aggregated by intermolecular attraction with zeta potentials being erased. Impurities smaller in specific gravity than the liquid are separated by flotation as shown by an arrow C, to be discharged from the vessel 21 through the second drain 21f. Those larger in specific gravity than the liquid are separated by sedimentation as shown by an arrow D, to be discharged from the vessel 21 through the first drain 21e.

Upon elimination of the relatively large-particled impurities, the liquid is introduced under pressure into the electrode vessel 25C as shown by arrow E, to uniformly contact with the adsorbent 29. At this time, ions in the porous surface of the adsorbent 29 are reinforced by the second electrodes 25A and 25B, so that gas, water and low molecular-weight impurities are adsorbed by the adsorbent 29 through Coulomb force of ion.

On the other hand, the filter 24A formed by the insulative dielectric member is supplied with voltage by the second electrode 25B and the outlet port 23A, to be charged with dielectric charges. Therefore, after passing through the adsorbent 29, colloidal particles and microparticles remaining in the liquid are attracted by the pump pressure and the dielectric charges to be collected on the outer periphery of the filter 24A and aggregated with zeta potentials being erased, thereby forming a cake layer to capture residual particles. Upon such filtration of the impurities, the liquid is discharged from the through-holes 23b of the outlet pipe 23A to the exterior of the vessel 21, as shown by an arrow B.

In order to renew the filter 24a, the adsorbent 29 and the electrode vessel 25C, the lid member 21 is detached from the container member 21a to remove the bottom plate 27 by loosening the fixture 28.

Since the second electrodes 25A and 25B are formed by porous or meshed members and the outlet pipe 23A is provided with the through-holes 23b, gas not adsorbed by the adsorbent 29 is discharged from the vessel 21 with the liquid.

Figure 4:
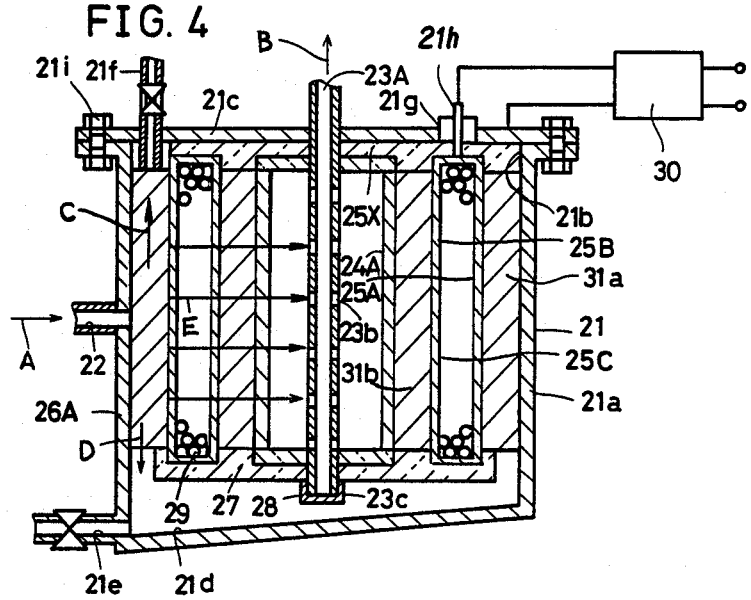

Referring to FIG. 4 showing another embodiment, a first dielectric member 31a formed by an insulating material such as rough-meshed glass fiber is provided between the container member 21a and the second electrode 25A. A second dielectric member 31b formed by an insulating material such as rough-meshed glass fiber is provided between the second electrode 25B and the filter 25A.

The first and second dielectric members 31a and 31b are charged due to application of voltage through the electrode apparatus 26A, whereby ionized impurities in the liquid are immediately captured by the first and second dielectric members 31a and 31b.

Therefore, liquid such as lubricating oil for a vacuum pump containing micro-sized fine impurities can also be downwardly filtrated in a short time with adsorption of gas in the liquid. In case of liquid such as cutting oil for a cutting machine containing large-sized impurities, the first and second dielectric members 31a and 31b serve as filters thereby to effectively prevent clogging of the filter 24A.

Although the fixture 28 is formed by a cap nut to block the end portion 23c of the outlet pipe 23A in the embodiment as shown in FIGS. 3 and 4, the end portion 23c itself may be blocked and the fixture 28 may be formed by an ordinary nut.

In order to treat acqueous liquid such as cutting liquid, the voltage applied by the transformer 30 may be of 1 to 10 V/cm. Further, polarity of the voltage to be applied to the electrodes 25A and 25B and the lid member 21c may be selected in response to the type of the adsorbent 29. The type of the application voltage, i.e., DC voltage, AC voltage or DC-AC superposed voltage, may be determined in response to the type of the liquid to be treated, i.e., aqueous or nonaqueous.

Figure 5:
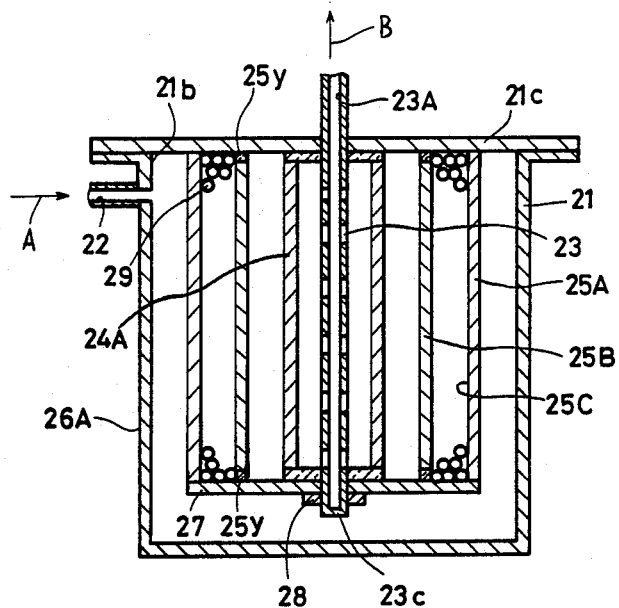
FIGS. 5 to 10 are front sectional views showing other embodiments of the present invention.

FIG. 5 shows a further embodiment of the present invention. First and second electrodes 25A and 25B are formed by porous or meshed members, and end surfaces thereof are mounted to a lid member 21c directly and indirectly through an insulating member 25y respectively so that the same are doubled concentrically about an outlet pipe 23A. The other end surfaces are blocked by a bottom plate 27 so that the first and second electrodes 25A and 25B, the lid member 21c and the bottom plate 27 define a cylindrical electrode vessel 25C for containing adsorbent 29.

An electrode apparatus 26A is formed by the first and second electrodes 25A and 25B and the outlet pipe 23A serving as a third electrode.

In the embodiment as shown in FIG. 5, the adsorbent 29 is provided between the first and second electrodes 25A and 25B, to be supplied with DC voltage. Thus, the adsorbent 29 is attracted in the field direction to be provided with strong charges in its porous surface by atomic polarization and molecular polarization while strong Coulomb force continuously works between the adsorbent 29 and impurity molecules to effectively adsorb the impurities in the pores of the adsorbent 29.

Figure 6:
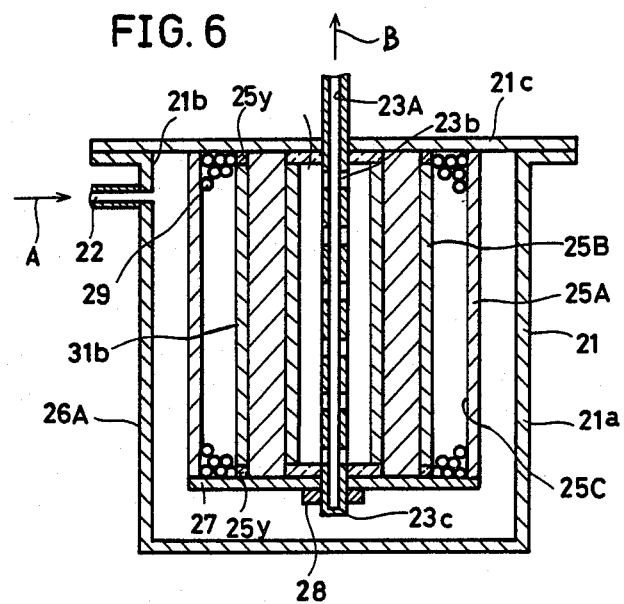

FIG. 6 shows still another embodiment of the present invention. A dielectric member 31b formed by an insulating material such as rough-meshed glass fiber is provided between a second electrode 25B and a filter 24A.

The dielectric member 31b is charged due to application of voltage through the second electrode 25B and an outlet pipe 23A, so that ionized impurities in liquid to be treated are immediately captured by the dielectric member 31b.

Figure 7:
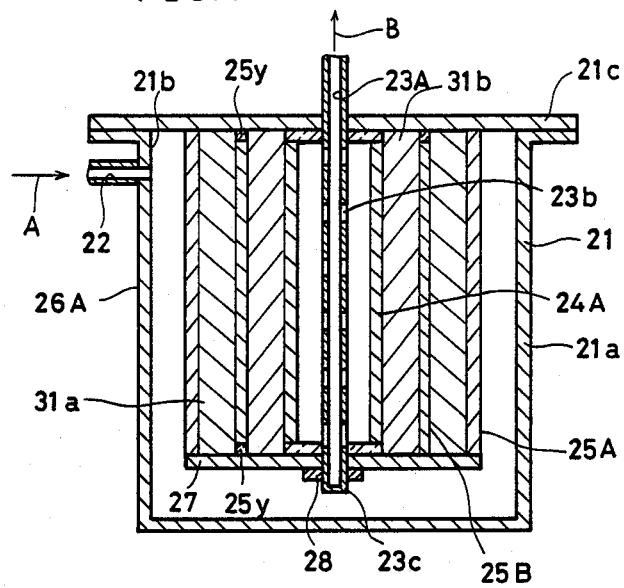

FIG. 7 shows a further embodiment of the present invention. A first dielectric member 31a formed by an insulating material such as rough-meshed glass fiber is provided between first and second electrodes 25B. A second dielectric member 31b formed by an insulating material such as rough-meshed glass fiber is provided between second electrode 25B and a filter 24A.

The first and second dielectric members 31a and 31b are charged due to application of voltage through an electrode apparatus 26A, so that ionized impurities in liquid to be treated are immediately captured by the first and second dielectric members 31a and 31b.

Figure 8:
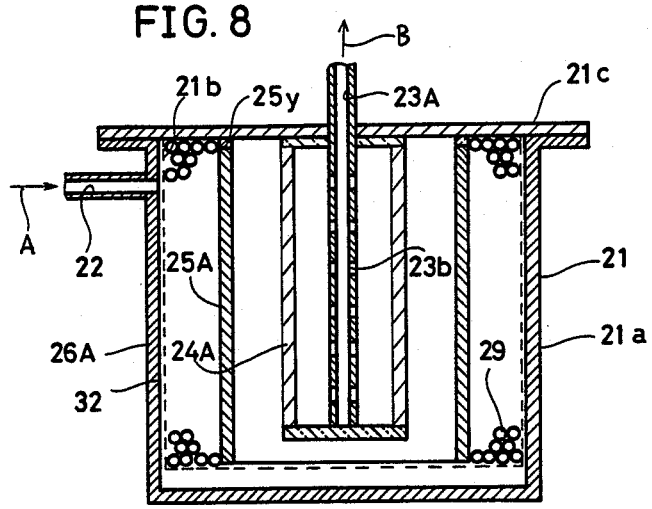

FIG. 8 shows a further embodiment of the present invention. An electrode apparatus 26A is formed by a container member 21a serving as a first electrode, a second electrode 25A mounted to a lid member 21c through an insulating member 25y and an outlet port 23A formed by a pipe inserted into the lid member 21c and the filter 24A and having through-holes 23b to serve as a third electrode. A cage 32 of a meshed insulating material contains the filter 24A and the second and third electrodes 25A and 23A, and is mounted to the lid member 21c. Adsorbent 29 is contained in the cage 32 between the container member 21a and the second electrode 25A.

Thus, the lid member 21c is provided with the cage 32 to contain the adsorbent 29, whereby waste disposal can be collectively performed by the adsorbent 29.

Figure 9:
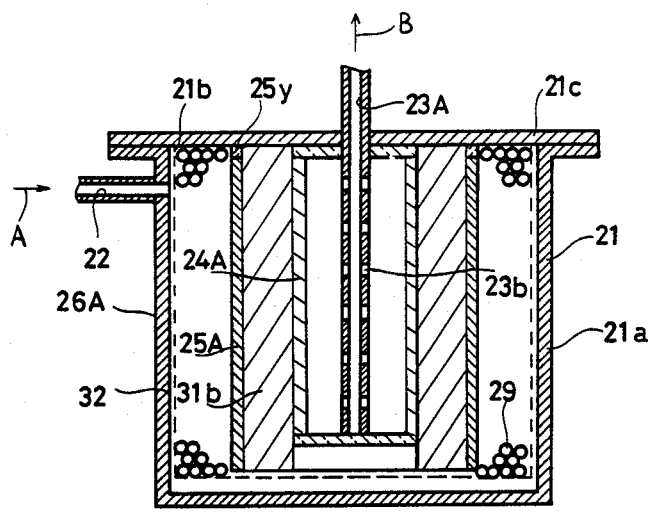

FIG. 9 shows a further embodiment of the present invention. A dielectric member 31b of an insulating material such as fine-meshed glass fiber is provided in a cage 32 between a second electrode 25A and a filter 24A.

The dielectric member 31b is charged due to application of voltage through the second electrode 25A and an outlet pipe 23A, whereby ionized impurities in liquid to be treated are immediately captured by the dielectric member 31b.

Figure 10:
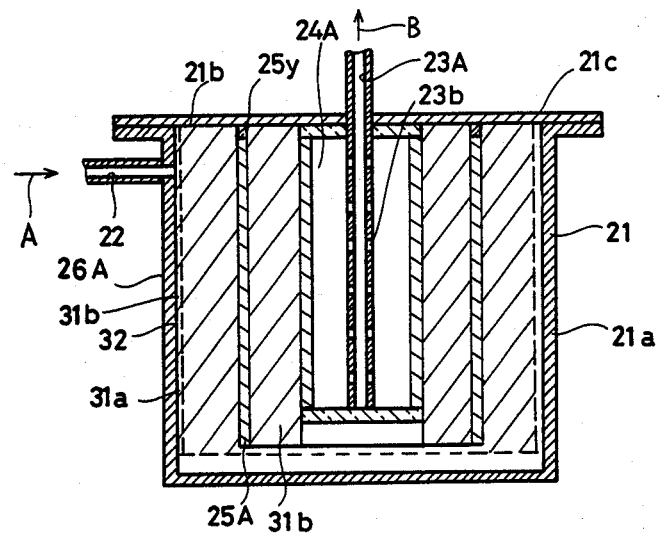

FIG. 10 shows a further embodiment of the present invention. A first dielectric member 31a of an insulating material such as rough-meshed glass fiber is provided in a cage 32 between a container member 21a and a first electrode 25A. A second dielectric member 31b of an insulating material such as fine-meshed glass fiber is provided between a second electrode 25B and a filter 24A.

The first and second dielectric members 31a and 31b are charged due to application of voltage through an electrode apparatus 26A, so that ionized impurities in liquid to be treated are immediately captured by the first and second dielectric members 31a and 31b.

Figure 11:
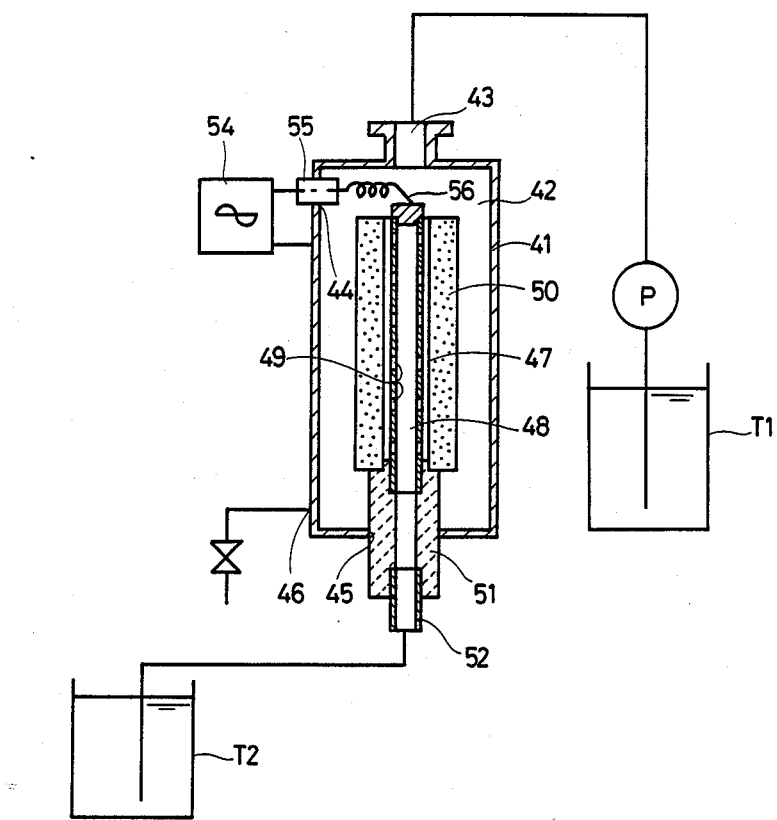
FIG. 11 illustrates another basic structure of the present invention.
Figure 12:
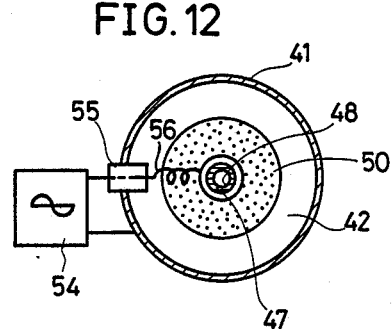
FIG. 12 is a sectional view taken along the diametrical direction of FIG. 11.

FIGS. 11 and 12 show another basic structure of the present invention. An outer cylindrical electrode 41 is provided with an inlet port 43 communicating with a treating chamber 42 and an electric communication opening 44 in its upper part and an electrode support hole 45 and a drain connection opening 46 in its bottom part. A central electrode 47 forming a pair of electrodes with the outer cylindrical electrode 41 is provided with a path 48 axially passing through its interior, which path 48 is formed with a large number of holes 49 in its peripheral wall. A filter 50 is provided along the outer periphery of the central electrode 47 to cover the same. An insulator 51 is inserted in the electrode support hole 45 to insulatingly support the central electrode 47 with respect to the outer cylindrical electrode 41 and connect the lower end portion of the path 48 with an outlet port 52. A low-voltage AC power supply 54 is connected between the outer cylindrical electrode 41 and the central electrode 47. An introducing insulator 55 is inserted into the electric communication opening 44, to insulatingly support a lead wire 56 connected from the low-voltage AC power supply 54 to the central electrode 47 with respect to the outer cylindrical electrode 41.

Description is now made on the operation of this structure. Untreated liquid from an untreated liquid tank T1 is introduced into the inlet port 43 by a pump P. The untreated liquid thus introduced into the outer cylindrical electrode 41 helically flows along the periphery of the central electrode 47 downwardly from the upper part. Then, AC voltage of 1 to 1,000 V/cm is applied by the low-voltage AC power supply 54 upwardly between the central electrode 47 and the outer cylindrical electrode 41. By such application of voltage, submicron particles and colloidal particles in the untreated liquid are attracted to the surface of the filter 50 by electrophoresis with zeta potentials being neutralized, and aggregated and precipitated to be captured by the surface of the filter 50.

Namely, since the filter 50 is made of a dielectric material, the same is attracted in the field direction to be polarized and provided with surface charges. Therefore, the submicron particles and colloidal particles are aggregated on the surface of the filter 50 with neutralization of the zeta potentials of electric double layers thereof. The aggregated particles form a cake layer on the surface of the filter 50, to filtrate the liquid. The liquid thus filtrated through the cake laye and the filter 50 flows into the path 48 through the passholes 49, to be discharged from the outlet port 52 into a clean liquid tank T2.

Thus, the submicron particles and colloidal particles form a cake layer on the surface of the filter 50 to reduce the load on the filter 50, thereby to increase the life thereof to five to 10 times.

The low-voltage AC power supply 54 may be replaced by a low-voltage DC power supply or a low-voltage AC-DC superposed voltage source.

Figure 13:
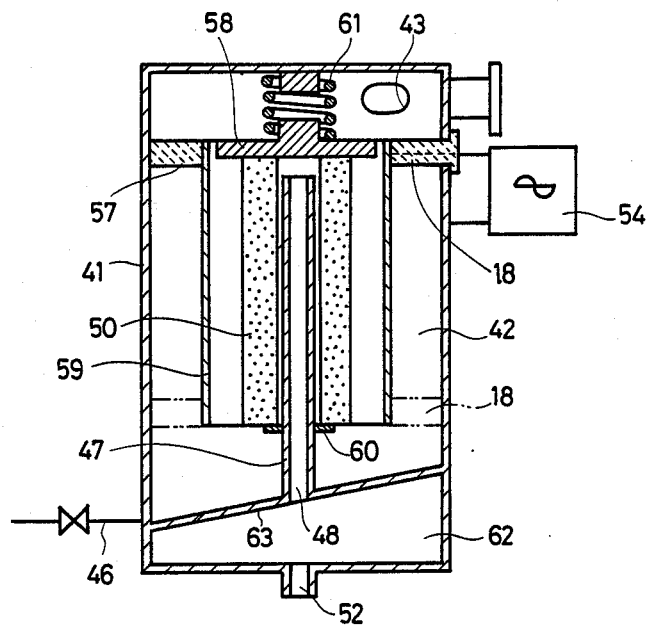
FIG. 13 shows a modification in which an electrode apparatus as shown in FIG. 11 is formed by composite electrodes.
Figure 14:
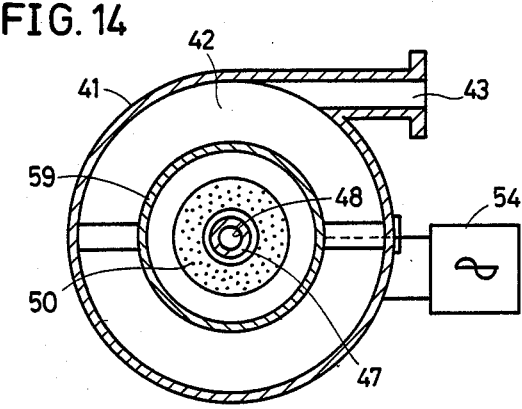
FIG. 14 is a sectional view taken along the diametrical direction of FIG. 13.

Further, the low-voltage AC power supply 54 may be replaced by a high-voltage DC power supply to break electrostatic coupling of liquid molecules and impurity molecules, thereby to aggregate the impurity molecules while neutralizing zeta potentials thereof FIGS. 13 and 14 show a further embodiment of the present invention. An outer cylindrical electrode 41 serving as a first electrode contains a treating chamber 42 and an inlet port 43, which are partitioned by a holding insulator panel 57 and an insulating panel 58. The holding insulator panel 57 insulatingly supports an inner electrode 59 serving as a second electrode with respect to the outer cylindrical electrode 41. The insulating panel 58 is adapted to press a filter 50 against a support plate 60 provided on the outer periphery of a central electrode 47 serving as a third electrode by a spring 61. The treating chamber 42 is partitioned from a clean liquid collecting chamber 62 by a drain connection inclined wall 63. The lower end of the central electrode 47 is inserted into the drain connection inclined wall 63, which in turn connects the central electrode 47 to the outer cylindrical electrode 41 at the same potential.

Untreated liquid is introduced from the upper tangential direction into the treating chamber 42 through the inlet port 43 to helically flow downwardly along the periphery of the central electrode 47. The liquid then upwardly flows between the inner electrode 59 and the central electrode 47 to pass through the filter 50, and downwardly flows in the path 48 of the central electrode 47 to reach the outlet port 52 through the clean liquid collecting chamber 62. The drain connection inclined wall 63 and the inner electrode 59 are in electrode structure to extremely increase the speed of sedimentation of impurities, while insedimental impurity particles are attracted by the changes on the surfaces of the central electrode 47 and the filter 50 to be aggregated and form a cake layer, thereby to reduce the load on the filter 50 and increase the life thereof.

Figure 15:
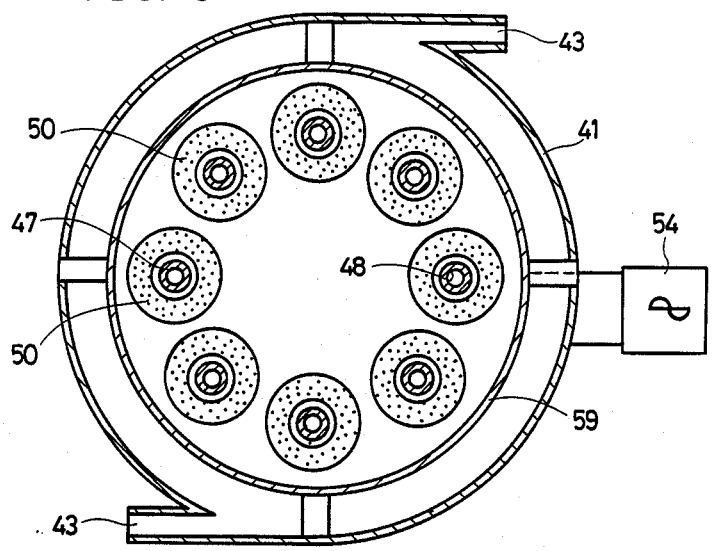
FIG. 15 illustrates a modification in which a filter as shown in FIGS. 13 and 14 is increased in number.
Figure 16:
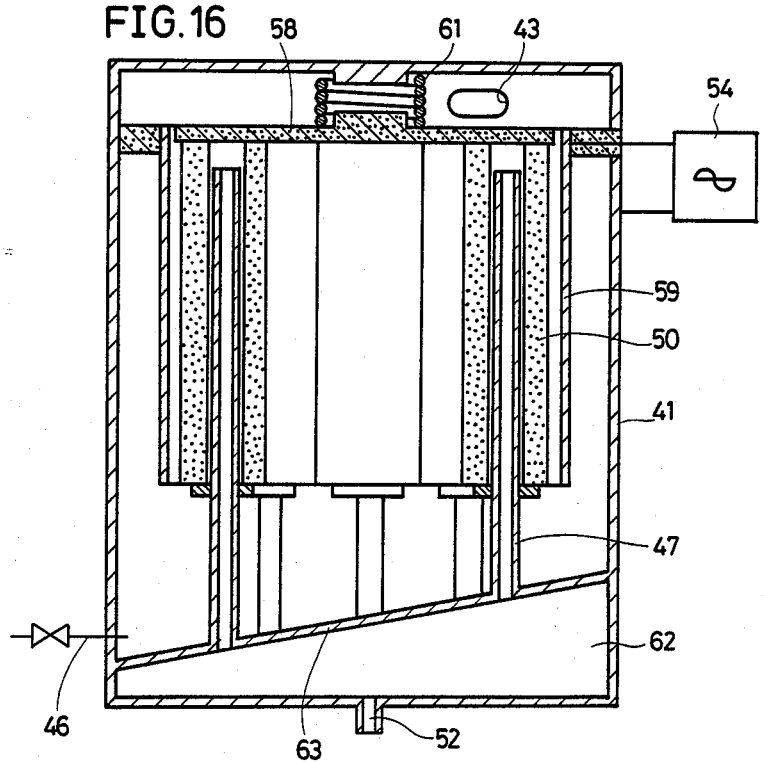
FIG. 16 is a sectional view taken along the diametrical direction of FIG. 15.

FIGS. 15 and 16 show a modification of the embodiment as shown in FIGS. 13 and 14, in which the device is further increased in size with an increased number of filters 50. Two inlet ports 43 are provided along the tangential direction, while a number of central electrodes 47 covered by the filters 50 are provided along the inner peripheral surface of an inner electrode 59.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid filter device comprising:
   electrode means partially forming a communication path within said filter device and including first and second generally concentric electrodes in said path with an adsorbent therebetween and a third electrode formed by a pipe disposed radially inwardly of the second electrode and covered by a filter filtrating said liquid passing through said adsorbent, said pipe having through-holes permitting discharge or filtered fluid from the device; and
   voltage application means for applying DC voltage, AC voltage or DC-AC superposed voltage to said electrode means.

2. A liquid filter device in accordance with claim 1, wherein said first and second electodes are formed by a pair of concentrically arranged generally cylindrical members, and said third electrode pipe is disposed within the pair of cylindrical members.

3. A liquid filter device in accordance with claim 2, wherein a dielectric member is disposed between the filter covering the pipe and the cylindrical members.

4. A liquid filter device, comprising:
- a first electrode means being formed by a container member which comprises an inlet port for inflow of a liquid including impurities, and an outlet port for outflow of the liquid from the container member;
- a second electrode means being formed by a pair of electrodes of substantially the same potential which are provided concentrically and made of meshed or porous members through which the liquid flows from the inlet port, and adsorbent provided between said pair of the electrodes of the second electrode means which adsorbent discharges the liquid through to the outlet port to the outside of said first electrode means after adsorbing said impurities; and
- a voltage application means for applying DC voltage, AC voltage or DC-AC superposed voltage to said first and second electrode means.

5. A liquid filter device in accordance with claim 4 wherein said second electrode means has a filter inside the innermost one of said electrode which communicates with the outlet port of the first electrode means.

6. A liquid filter device in accordance with claim 4, wherein said second electrode means has, in an inside space of the innermost electrode of the pair of the electrodes;
- a filter communicating with the outlet port of the first electrode means; and
- a third electrode means which is provided in an inside space of said filter.

7. A liquid filter device in accordance with claim 6, wherein said third electrode means is formed by a pipe having through-holes or opens to communicate with the outlet port of the first electrode means.

8. A liquid filter device according to claim 1, wherein said first and second concentric electrodes have substantially the same potential.

9. The liquid filter device according to claim 4, wherein said absorbent includes a plurality of individual adsorbent particles with substantially the entire surface of substantially each particle having the same charge by virtue of said pair of electrodes of the second electrode means being of substantially the same potential.

* * * * *